Aug. 6, 1963     D. F. MELTON ETAL     3,099,913
UNDERWATER VEHICLE SYSTEM
Filed Jan. 20, 1960     6 Sheets-Sheet 1
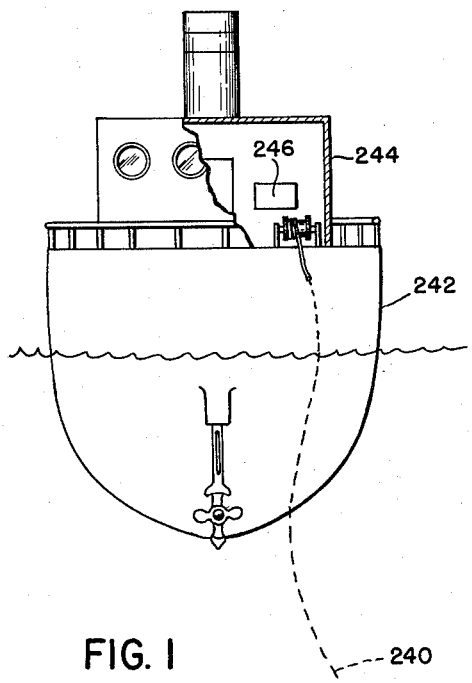
FIG. 1
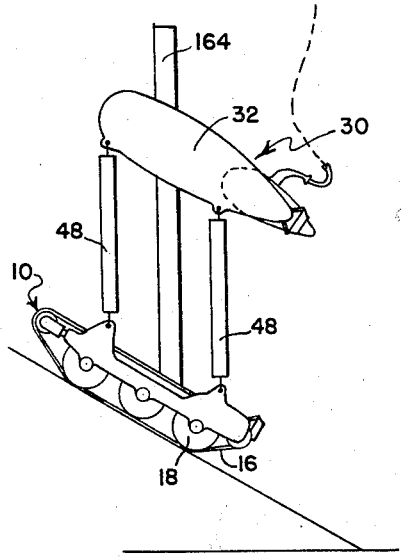
FIG. 2
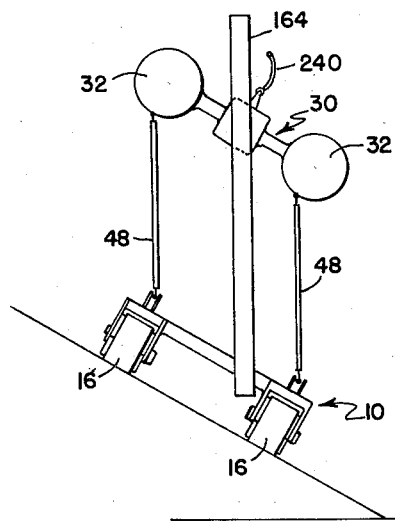
INVENTORS
DONALD F. MELTON
HAROLD E. FROEHLICH
BY *Stuart R. Peterson*
ATTORNEY INVENTORS
DONALD F. MELTON
HAROLD E. FROEHLICH
BY
Stuart R. Peterson
ATTORNEY INVENTORS
DONALD F. MELTON
HAROLD E. FROEHLICH
BY
Stuart R. Peterson
ATTORNEY

United States Patent Office 3,099,913
Patented Aug. 6, 1963

3,099,913
UNDERWATER VEHICLE SYSTEM
Donald F. Melton and Harold E. Froehlich, Minneapolis, Minn., assignors to General Mills, Inc., a corporation of Delaware
Filed Jan. 20, 1960, Ser. No. 3,664
10 Claims. (Cl. 61—69)

This invention relates generally to an underwater vehicle system, and pertains more particularly to underwater apparatus for performing manipulations at various submerged locations.

One object of the invention is to provide a vehicle for underwater explorations and installations which will be both highly maneuverable and capable of performing various manipulations required in the carrying out of a multiplicity of tasks. Among those tasks for which the instant apparatus is intended to perform are the placing, installing, maintaining, and recovering of items on the bottom of the ocean. It is an aim of the invention to reach a desired underwater location including any location that might be at a great depth. Accordingly, it is within the purview of the instant invention to provide an underwater vehicle that can be remotely controlled from a suitable vantage point, such as from a surface ship in the general area above the vehicle.

Another object of the invention is to provide a vehicle that will provide an underwater station that can be maintained for extended periods of time.

A further object of the invention is to provide an underwater vehicle that can be driven along the bottom of a body of water or, when circumstances dictate, propelled in a controlled manner in a spaced relation from the bottom.

A still further object is to provide a vehicle that cannot be overturned underwater.

Another object is to provide a vehicle of the contemplated character that can be ship launched or driven out from a suitable shore base.

Yet another object of the invention is to provide a vehicle that possesses an effective working volume which is enclosed on three sides, thereby permitting optimum lighting, television viewing, load supporting, and the carrying out of desired manipulations.

While it is an object of the invention to provide an underwater vehicle that cannot be overturned, it is a further object of the invention to provide a vehicle that keeps the supported loads at the vehicle's center of lift and at the vehicle's center of gravity. In this way, a uniformly distributed ground pressure is maintained and there is no disturbance of the vehicle's ability to maintain itself in an upright position.

Still further, the invention has for an object the provision of horizontal propulsion by reason of propellers located at two levels, this being in addition to propulsion by means of an endless track arrangement. By virtue of such a propulsion system, large and/or tall objects can be readily transported through the water by the vehicle without upsetting the vehicle as already alluded to and also without imposing unduly large bending moments on the object being transported. In this regard, the invention is particularly suitable for the carrying of elongated objects, such as columns, pilings and the like. Due to the provision of endless tracks, it will be appreciated that propulsion is made readily available when the bottom is sufficiently solid and under such circumstances a fine position control of the vehicle can be achieved regardless of ocean currents. On the other hand, should there be a loss of traction via the endless tracks, the propellers at the two levels are always available to provide the necessary advancement of the vehicle to its intended location.

Another object of the invention is to provide propellers rotatable about a vertical axis so that a vertical thrust can be produced which is sufficient to lift the entire vehicle from the bottom in order to clear large obstacles or discontinuities in the terrain, or when circumstances require, to increase the ground pressure by providing better traction or the maintenance of a desired stationary position.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a rather diagrammatic representation of an underwater vehicle constructed in accordance with the teachings of our invention, a ship for controlling said vehicle from a remote vantage point being also depicted in this particular view;

FIG. 2 is another diagrammatic representation, this view being taken from the front of the vehicle and showing the apparatus as it would appear when traversing the side of a submerged hill;

Figure 3:
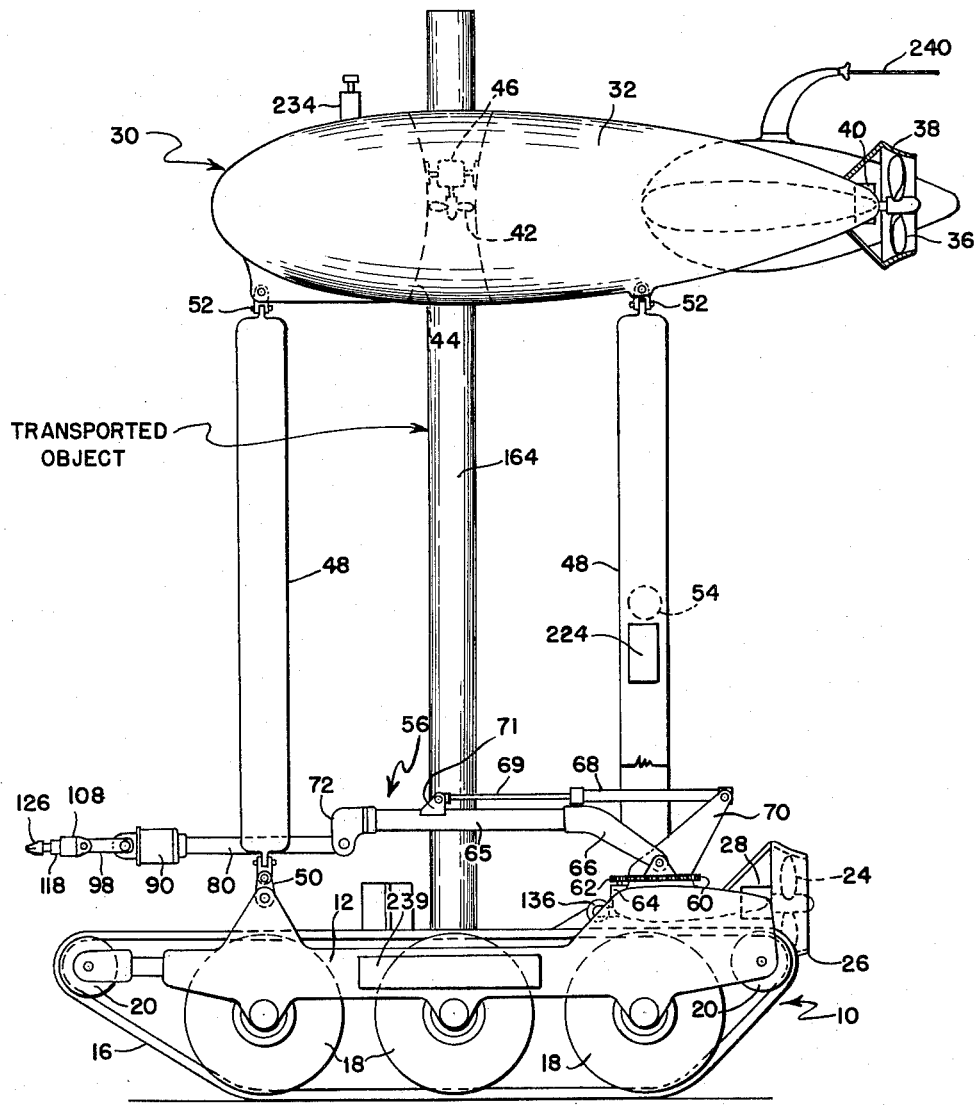
FIG. 3 is a side elevational view of the vehicular apparatus, the manipulator carried thereby being illustrated in one particular position.
Figure 4:
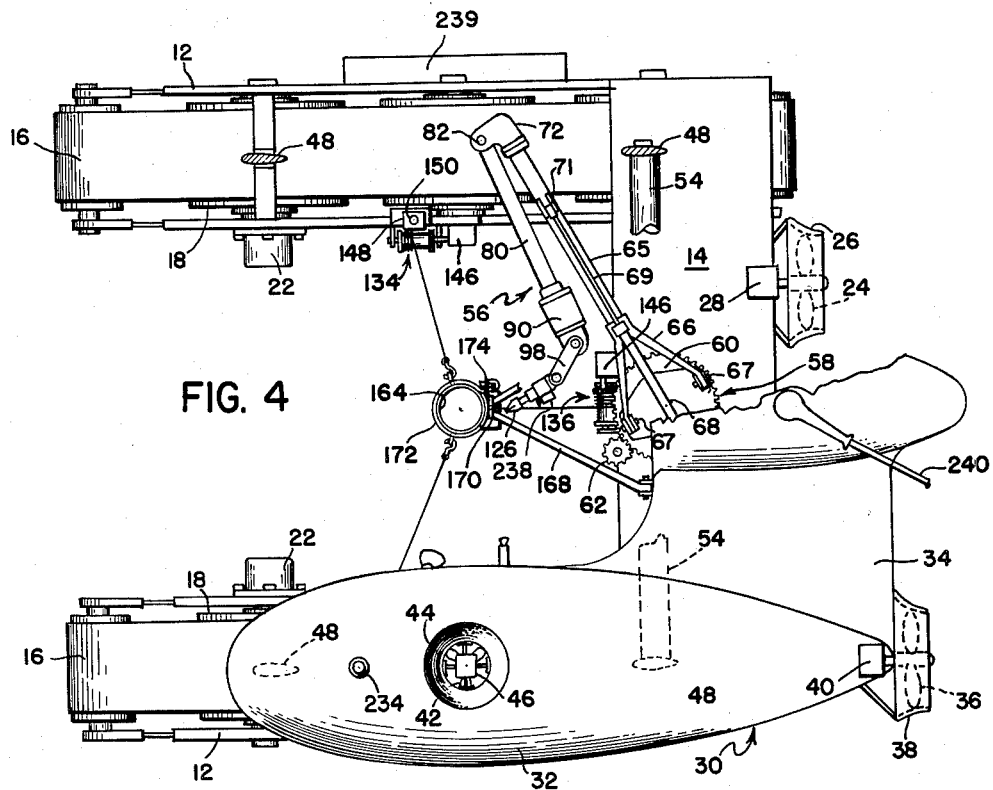
FIG. 4 is a plan view corresponding generally to what would be observed when looking down on FIG. 3, portions of the buoyant tank however being removed for the purpose of showing what would otherwise be concealed and the manipulator being shown in a different position so as to demonstrate to better advantage the versatility of the manipulator.
Figure 5:
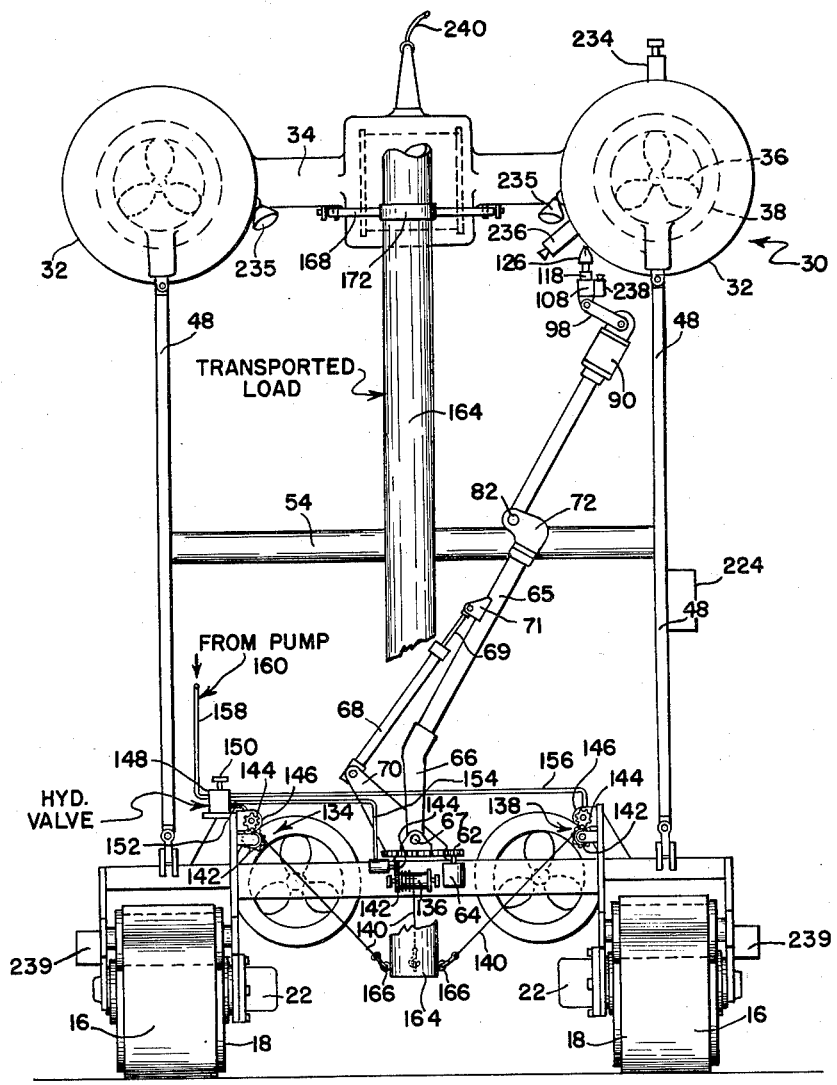
FIG. 5 is a front view also corresponding generally to what would be observed when viewing FIG. 3 from the left, the manipulator in this instance being pictured in still a different position.

Referring now in detail to FIGS. 3, 4, and 5, underwater apparatus for performing manipulations at various submerged locations which has been selected for the purpose of amplifying the instant invention comprises a generally U-shaped chassis 10 having side legs or frame portions 12 and a rear connecting tie or bight portion 14. The connecting tie 14 at the rear forms a unitary, rigid structure.

The chassis is equipped with endless tracks 16 extending along each side. As can be observed from FIG. 5, the side legs or frame portions 12 are somewhat channel-shaped and therefore are configured so as to accommodate the endless tracks 16. Each endless track 16 extends about several wheels 18 and a pair of idlers 20. At least one wheel 18 on each side is driven by a hydraulic motor 22. If desired, a plurality of such motors might be employed, there being then one for each of the wheels 18. To provide maximum pulling ability on soft sea bottoms, the idlers 20 are mounted so that they are above the axles for the several wheels 18. Also, no fixed structure belonging to the chassis 10 exists below the actual support. In this way, the entire vehicle can sink into the soft bottom to a depth nearly up to the wheel axles to gain ground support without bottoming on a fixed structure or portion of the chassis. Although not specifically illustrated, it will be appreciated that the idlers 20 are designed so that the tension of each endless track 16 may be adjusted for proper operation.

Inasmuch as the endless tracks 16 will frequently not provide the needed traction, owing to the condition of the bottom at certain times, it is within the purview of the invention to either augment or provide in lieu of the traction that can be derived from the track 16, additional propulsion in the form of a pair of propellers 24 carried on the connecting tie 14 of the chassis 10. As can be seen from FIG. 3, these propellers 24 are disposed for rotation about a generally horizontal axis. It can further be discerned that each propeller is located within a shroud 26. Further, each propeller 24 is driven by means of a hydraulic motor 28.

Contributing tremendously to the practicality of the present invention is a U-shaped buoyant tank labelled 30. Quite briefly, it can be pointed out that this tank is comprised of a pair of side chambers 32 having a connecting chamber 34 communicating therebetween. This tank 30 contains a substance which is lighter than water and which is relatively uncompressible. Through the use of such a medium, an underwater lift is provided without the necessity of a heavy walled pressure vessel. Thus, the tank 30 can be fabricated from relatively light weight materials, such as plastics, plastic-fabric combinations, and sheet metal. Although not specifically pictured, it will be understood that suitable reinforcements can be included for strength and rigidity. As will presently be made manifest, the tank 30 is located relatively high on the vehicle so as to impart thereto its un-upsettable characteristic. Furthermore, it can be pointed out that the tank 30 should be streamlined so as to reduce drag. Actually, the tank can have a variety of shapes. However, a single streamlined volume provides a maximum lift at minimum drag, but the U-shaped configuration which has been shown allows tall objects to be carried in a manner which will hereinafter be described more fully.

Without going into a too detailed description of the tank 30, it perhaps should be mentioned, though, that appropriate bulkheads having small openings therein can be located at a desired location within the tank so as to serve as both stiffeners and surge dampeners when fluids are used for lifting purposes. A separate compartment can be included to reduce the surge of liquids and obtain the proper amount of distribution of lift. Ballonets, diaphragms, cylinder-pistons, etc. are included for pressure equalization to account for any volumetric change of the lifting medium due to pressure, temperature, or leakage effects.

For the purpose of providing a thrust for advancing the tank 30, a pair of propellers 36 are mounted for rotation about a generally horizontal axis. These propellers are disposed in shrouds 38 and each is driven through the agency of a hydraulic motor 40. Hence, it will be obvious that the tank 30 does not depend upon the same propulsion means provided for the chassis 10. Stated somewhat differently, overall horizontal propulsion of the apparatus is provided by propellers at two levels and by the endless tracks which have also been mentioned. This arrangement allows a large and/or tall object to be transported through the water quite readily by the vehicle without upsetting the vehicle or imposing unduly large bending moments on the object being moved. More will be said hereinafter concerning the specific configuration of objects capable of being handled. The point to be stressed at the moment is that the endless tracks 16 can provide propulsion and also allow fine position control regardless of ocean currents. On the other hand, in case of loss of traction via the tracks, the propellers will provide propulsion.

In order that the vehicle can be lifted from the bottom so as to clear large obstacles and pass over crevasses and the like in the terrain, or, to increase the ground pressure in order to produce better traction through the agency of the endless tracks 16, or to position the vehicle in a fixed position, additional propellers denoted by the reference numeral 42 are employed. These propellers, as best viewed in FIGS. 3 and 4, are mounted for rotation about parallel vertical axes. Ducts 44 extending completely through the side chambers 32 of the tank 30 encircle these propellers. As with the previously mentioned propellers, hydraulic motors 46 can be used for the purpose of driving the propellers 42.

Describing now the utilization of four elongated connecting struts designated by the numeral 48, it will be noted that these struts are connected at their lower ends to the chassis 10 by way of four universal joints 50. Similar universal joints 52 serve to connect the upper ends of these struts to the underside of the buoyant tank 30. Due to the use of the universal joints 50, 52, it will be understood that the struts 48 are allowed to pivot relative to the chassis 10 and also with respect to the tank 30. This feature permits the tank 30 to move relative to the chassis 10 in such a way that the center of lift remains over the center of gravity regardless of the slope upon which the vehicle is situated or is traversing. FIGS. 1 and 2 are specifically intended to illustrate this feature with considerable clarity. From these two figures, it is to be noted that the centerlines of the tank and chassis always remain parallel due to the parallel linkage of the struts 48. Consequently, the centerline of the tank 30 is kept parallel to the direction of travel, thereby maintaining a minimum drag. Still further, the struts themselves are streamlined in the direction of intended movement so as to minimize the drag. To prevent rotation of the tank 30 relative to the chassis 10 about a vertical axis, a torque tube 54 connects at least two of the connecting struts 48 so as to prevent the undesired relative rotation between these struts. As shown, the torque tube 54 extends between the rear pair of elongated struts 48.

Because of the diversity of tasks and operations which apparatus of this character is likely to be called upon to carry out, it is very important that a manipulator be provided which is capable of shouldering the diversity of duties that will be expected of it. Accordingly, the present invention has for an aim the provision of a manipulator indicated generally by the reference numeral 56 which will be satisfactory for the variety of work that it is expected to achieve. This manipulator 56 includes a rotatable base 58, the base being rotatable about a vertical axis extending through the previously mentioned tie 14 of the chassis 10. Integral with the base 58 is a ring gear 60 which has in mesh therewith a pinion 62 disposed on the shaft of an electric motor 64. Owing to the severity of the environment with respect to electric motors, it will be understood that when an electric motor is utilized, it will be canned or sealed within an electrically nonconductive liquid. However, if desired, a hydraulic motor may be substituted for the motor 64. As will presently be recognized, though, an electric motor for this particular rotative duty is somewhat preferred. Associated with the base 58 is a first boom element 65 having an obtuse clevis 66 integral therewith. By reason of the clevis 66 a pivotal connection is made with said rotatable base 58, there being a pair of pins 67 actually providing the desired pivotal action.

Continuing with the description of the manipulator 56, it will be observed that the first boom element is hydraulically actuated through the agency of a cylinder 68 containing a reciprocably disposed piston and rod 69 therein. The closed end of the cylinder 68 is pivotally connected to a clevis 70 mounted on the rotatable base 58, this clevis 70 angling upwardly so as to provide an offset mounting of the closed end of said cylinder 68. The free end of the piston rod is pivotally connected to a clevis 71 fixedly attached to the first boom element 65. As will later be made clearer, the introduction of fluid under pressure will cause the piston rod 69 to move toward the closed end of the cylinder 68 and will thereby raise the first boom element 65.

Figure 6:
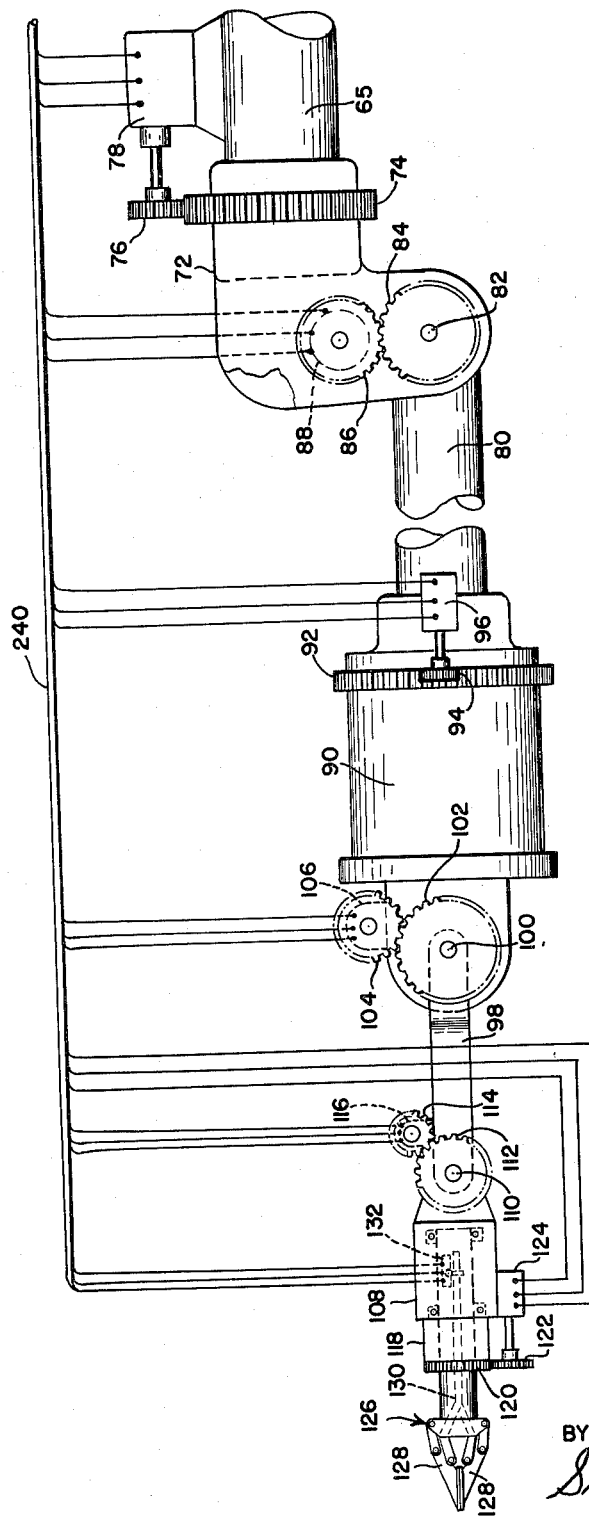
FIG. 6 is a side view of the manipulator itself, the right-hand portion having been removed in order to permit the showing of the manipulator on a fairly large scale.

On the end of the boom element 65 opposite the clevis 66 is an L-shaped housing 72. This housing is mounted for rotation about the longitudinal axis of the boom element 65. To effect the rotation of the housing 72 a ring gear 74 is made integral therewith. This arrangement is clearly shown in FIG. 6 which figure details the manipulator construction with considerable particularity. From this figure it will be seen that the ring gear 74 has engaged therewith a pinion 76 which is rotated by an electric motor 78, this motor being fully enclosed as is the motor 64.

The manipulator 56 comprises a second boom element 80 which is pivotally connected to the L-shaped housing by means of a transversed shaft or a pin 82. Because of the L-shaped configuration of the housing 72, it will be perceived that the pin or shaft 82 is somewhat offset from the longitudinal axis from the first boom element 65. At any rate, it is to be noted that the shaft 82 is equipped with a gear 84 so that the engagement of a pinion 86 with said gear 84 will cause rotation of the shaft 82 and the second boom element 80. The drive means for this pinion 86 is a canned or sealed electric motor 88.

Next to be described with respect to the overall manipulator 56 is its shoulder housing 90 which has a ring gear 92 circumscribed thereabout, the gear 92 being engaged by a pinion 94 carried by an electric motor 96 of similar construction to the previously mentioned sealed motors utilized on the manipulator 56.

The manipulator 56 is further articulatively designed by reason of the inclusion of what will be termed a first arm portion 98. This arm portion 98 is connected to the shoulder housing 90 through the medium of a transverse shaft 100. Stated somewhat differently, the shaft 100 provides a shoulder joint. On the shaft 100 is a gear 102 enmeshed with a driving pinion 104 carried by an electric motor 106, this motor 106 also being of the sealed variety.

Still further, the manipulator 56 comprises a second arm portion 108 which is pivotally connected with the first arm portion by reason of a transverse pin 110. The pin 110 provides what might be termed an elbow joint. To effect the pivotal action a gear 112 is affixed to the pin or shaft 110 and it has in engagement therewith a pinion 114 which is rotated by a sealed or canned electric motor 116.

What will be called a wrist member 118 is rotatably mounted on the longitudinal axis on the second arm portion 108. Rotation is realized by a ring gear 120 encircling said wrist member 118. As can be observed from FIG. 6 the ring gear 120 is driven by pinion 122 carried on the shaft of an electric motor 124, the motor 124 being secured to the second arm portion 108.

In order to perform rather delicate manipulations, a hand or grip mechanism labelled 126 is supported at the free end of the manipulator 56, the hand or grip mechanism actually forming a part of the manipulator. As can be seen from FIG. 6, this mechanism includes a pair of articulatively disposed jaws 128. The jaws are moved toward and away from each other by a reciprocable member 130. Although not disclosed herein with any degree of fullness, the motor 132 contained within the second arm portion 108 is instrumental in providing the desired gripping action. This hand or grip mechanism 126 may be identical with that which is fully disclosed in Bergsland et al. Patent 2,861,701.

Although not a part of the manipulator 56 nonetheless a trio of winches 134, 136 and 138 is employed. These winches 134, 136 and 138 each have a flexible cable 140 encircled thereabout. For the purpose of reeling in and out the cable 140 in each instance, there is employed a gear 142 having a pinion 144 drivingly engaged therewith. The pinion 144 associated with each of the winches has a separate and distinct hydraulic motor 146 for effecting the rotation of the pinion and in turn the taking up or paying out the flexible cable. It is intended that the manipulator 56 inaugurate or initiate the operation of the several winches. To this end, a hydraulic valve 148 is provided which possesses a control knob 150 easily actuated by the hand or grip mechanism 126. From FIG. 5, it will be discerned that several conduits 152, 154, and 156 lead to the several motors 144. The valve 148 is connected by a conduit 158 to a pump 160 which is driven by an electric motor 162. This pump 160 and its driving motor 162 are both on the connecting tie or bight portion 14 of the chassis 10. Inasmuch as the pump 160 is also used to operate the motors 22 for the endless tracks 16, the motors 28 for the lower propellers 24, the motors 40 for the propellers 36, and the motors 46 with the propellers 42, more will be said hereinafter concerning this pump and the particular manner in which the liquid therefrom is conveyed to the various motors.

Having mentioned the several winches 134, 136, and 138, it is perhaps desirable to explain that these winches are provided for the purpose of elevating a given load or object during the transportation of said load from one place to another. Assuming for the sake of discussion that the load or object to be carried is in the form of a hollow elongated column or pipe 164, it is of advantage to have several eyes 166 disposed angularly about the lower end of this column or pipe 164. It will be appreciated that the manipulator can readily effect connection of the several cables 140 to these eyes so that when the winches are operated the column itself will be lifted. Inasmuch as it is contemplated that elongated objects, such as column 164, will be frequently carried an A-frame 168 is fixedly attached to the connecting chamber 34 of the tank 30. A semi-circular rest 170 is secured to the projecting end of the A-frame. Cooperating with the rest 170 is a flexible belt 172 which is attached to one vertical edge of said rest, the belt encircling the column 164 and finding securement in the form of a belt fastener 174 on the other side of the semi-circular rest 170. It will be appreciated that the manipulator 156 is capable of attaching the free belt end to the fastener 174.

Figure 7:
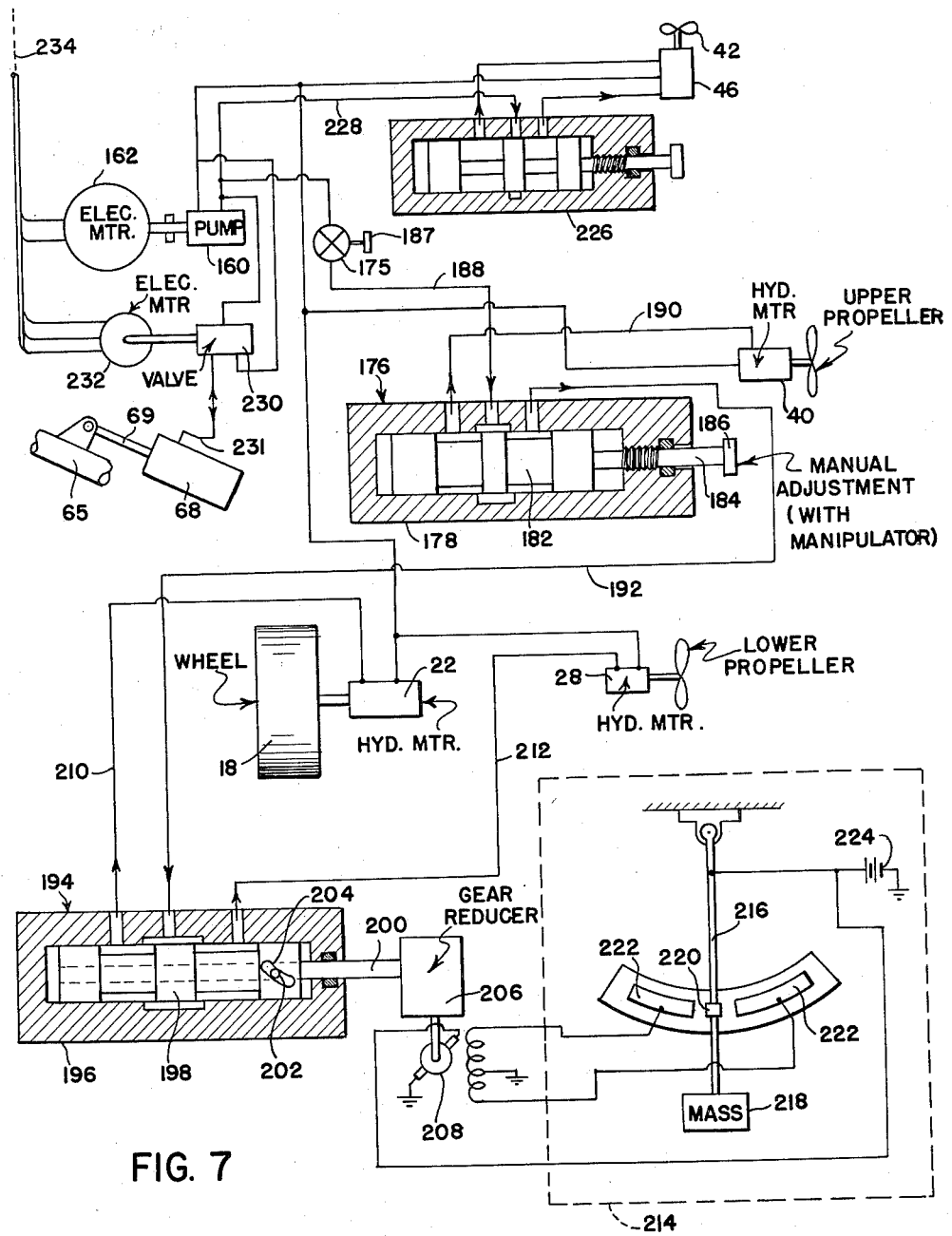
FIG. 7 is a schematic diagram showing the propulsion control that is utilized in the practicing of our invention.

Attention is now directed to FIG. 7 in which the propulsion control has been schematically portrayed. However, an introduction to the need for the specific control will undoubtedly be quite helpful. Accordingly, at the outset it can be explained that for reasons of stability and equalized ground pressure, it is desirable to keep the center of lift of the upper tank 30 close to a vertical line through the vehicle's center of gravity with the vehicle at rest; the arrangement of the various vehicle components accomplishes this automatically. Of course, when the vehicle is stationary the attitude of the struts 48 is vertical. On the other hand, vehicle motion due to the thrust applied to the endless tracks 16 via those wheels 18 provided with the hydraulic motor 22 and the thrust produced by the propellers 24 and 36 will move the upper tank 30 relative to the chassis 10 if the thrust is not properly proportioned.

From FIG. 7 it is to be further observed that a vehicle speed control or throttle valve 175 and a master valve 176 are employed for each side of the vehicle. For the sake of drawing simplicity though, only one speed control valve 175 and one master valve 176 has been depicted. Similarly, only one cylindrical casing 178 is shown which has reciprocably disposed therein a plunger 182. The plunger 182 can be positioned within the cylindrical casing 178 through the rotation of a threaded shaft 184. At the projecting end of this shaft 184 is a knob 186 that can be rotated by the manipulator 156. Similarly, the throttle valve 175 is equipped with a knob 187 so that it can be set and adjusted by the manipulator for controlling the vehicle's speed and for steering same. As can be seen from FIG. 7, one conduit 188 leads from the pump 160 to the casing 178 via the throttle valve 175, whereas a second conduit 190 extends to the hydraulic motor 40, and a third conduit 192 leads to a valve now to be referred to.

The valve that will now be described has been assigned reference numeral 194. It includes, a cylindrical casing 196 having a reciprocable plunger 198 therein which is positioned by reason of a threaded shaft 200. The shaft 200 carries a cam 202 which projects radially outwardly into a cam slot 204 in the plunger 198. A gear reducer 206 mechanically couples the shaft 200 to an electric motor 208, the specific construction of which motor is better reserved for explanation in a very short while. At this time, though, it will be observed that a conduit 210 leads to the wheel motor 22 for a given side, and a second conduit 212 extends to the lower propeller motor 28 for that same side of the apparatus.

Control for the proportioning valve 194 is in the form of a pendulum control or vertical deviation sensor 214. This sensor is mounted in a fixed relation with one of the struts 48 and through the intermediary of the proportioning valve 194 causes the thrust between the wheels 18 and the upper and lower propeller 24, 36, respectively, to be properly proportioned so that the struts 48 all remain vertical. The sensor 214 includes a pendulum arm 216 having a mass 218 carried at the lower end thereof. Also on the arm 216 is an electrical contact 220 which is capable of wiping a contact 222 fixedly disclosed to either side thereof, the contacts 222 being in the form of arcuate plates. A power source 224 is made available, which incidentally may be located remotely as hereinafter indicated more clearly.

Before continuing with the general description, it is perhaps wise to present a brief explanation as to how the proportioning operation is actually achieved. Therefore, as the strut 48 to which the pendulum control or sensor 214 is attached moves off vertical, the pendulum in attempting to remain vertical will exert a torque or side force. This torque or side force is used to operate the proportioning valve 194 which will apply more or less power to the upper propellers 36 as required to return the strut 48 to its vertical position. Depending upon the dynamics of the system, this can be either a proportional control or as depicted an on-off control. In actual practice, the pendulum is damped for proper operation. As can be seen this proportioning of thrust operates independently from the total applied power, for the total applied power for each side is governed by the particular setting of its master valve 176. The other side of the vehicle is similarly controlled by an identical control and proportioning system. It will therefore be understood that the speed of the vehicle will be determined by the position of the two throttle valves 175 (there being one for each side of the vehicle) and that steering in the illustrated instance will be achieved by throttling or closing one valve 175 more than the other. It will be further appreciated that the degree or division of propulsive effort between the motors 22 and 28 for each side can be initially set and later modified as desired through the medium of the master valves 178 (hereagain, there being one for each side) and that subsequent proportioning of the delivered power between these motors 22, 28 and the motor 46 will automatically take place because of the supervisory control exercised by the sensor 214 and the proportioning valve 194, there being a valve 194 for each side of the vehicle.

It is within the contemplation of the present invention to utilize the manipulator 56 for determining the speed of the hydraulic motor 46 which actuates the propeller 42 for each side. With this in mind, a manually operable valve 226 is placed in a conduit 228 for operation by the manipulator 56. Opening and closing the valve 226 will influence the speed at which the hydraulic motor 46 operates and in turn will provide the desired amount of vertical thrust in either direction, if the valve 226 is properly manipulated. In other words, the valve 226 is of such construction that the flow of liquid from the hydraulic pump 160 can be reversed through the hydraulic motor 46.

The actuating mechanism for the first boom element 65 of the manipulator 56 has already been referred to, it having been stated that this mechanism or actuator includes the cylinder 68 and the piston 69. Inasmuch as the flow of liquid into the cylinder 68 must be controlled in order to produce the desired angle of the first boom element 65 with respect to its rotatable base 58, a motor driven valve 230 for supplying liquid to the cylinder 68 is provided. The means for conveying such liquids is through a conduit 231, and the motor for actually positioning the valve 230 has been denoted by the numeral 232.

Certain auxiliary equipment is provided on the apparatus which has been herein disclosed. For instance, sonar equipment labelled 234 can be mounted on the tank 30 for navigational purposes. Likewise, lights 235 may be carried on the tank 30 (or on the chassis 10). Of importance is the fact that use is made of two television cameras 236 and 238, one of these cameras being situated on the tank 30 and the other on a portion of the manipulator 56. Still further, in a number of situations releasable weights 239 will be exceedingly useful inasmuch as these weights can be disconnected so that the entire apparatus can be made to surface automatically.

Figure 8:
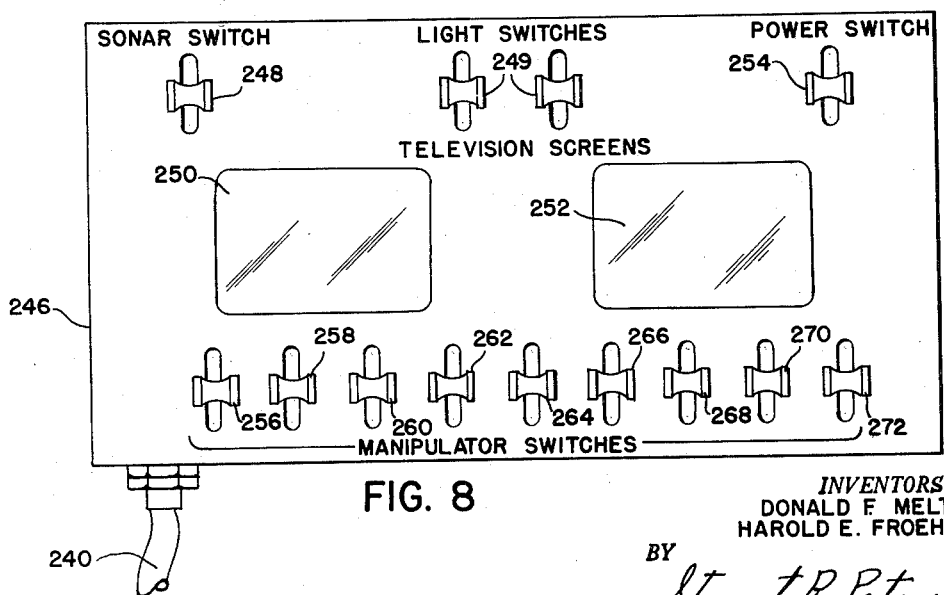
FIG. 8 is an enlarged view of the control panel which is housed on the ship shown in FIG. 1.

The various controls and supply of power are provided through the medium of a cable 240. This cable leads upwardly from the under water apparatus to a suitable vantage point, which in most instances will be in the form of a ship 242. The ship 242 is outfitted with a control observation cabin 244 in which is located a control panel 246 for supervising the underwater manipulations that are desired. The control panel 246 is set forth on a larger scale in FIG. 8. From this figure it can be seen that there is provided a sonar switch 248, light switches 249 and a pair of television screens 250, 252. Also, there is a power switch 254 for the motor 162. In addition to these switches, there are a number of individual manipulator switches for the purpose of causing the manipulator 56 to carry out the desired task to which it is to be put. Inasmuch as there is a relatively large number of motors mounted on the manipulator 56, it is believed that a tabulation of the switch designations in column form with the particular reference numeral of the motor for which that switch is to exercise a control placed opposite thereto will simplify an understanding of the manner in which the manipulator is to be controlled. Accordingly, the following table is provided.

| Switch number: | Motor number |
| --- | --- |
| 256 | 232 |
| 258 | 64 |
| 260 | 78 |
| 262 | 88 |
| 264 | 90 |
| 266 | 106 |
| 268 | 116 |
| 270 | 124 |
| 272 | 132 |

An effort has been made herein to describe the apparatus with sufficient particularity, frequently in conjunction with the manner of operation of certain components, so that the vehicle can be used without presenting a general operational sequence. It is to be understood that diverse operations are possible and that to detail each possible operation that might be achieved would serve no useful purpose.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. Underwater apparatus for performing manipulations at various submerged locations comprising a U-shaped chassis, and endless track at each side of said chassis for advancing said chassis along the bottom of a body of water when sufficient traction is available, first power means for applying power to said endless tracks, a first pair of spaced propellers mounted for rotation about generally horizontal axes on the connecting portion of said U-shaped chassis for advancing said chassis when insufficient traction is available for said endless tracks and for assisting said tracks when sufficient traction is available, second power means for applying power to said first spaced propellers, a U-shaped buoying tank having the legs in a common plane parallel to the plane of traction of said endless tracks, a second pair of spaced propellers mounted for rotation about generally horizontal axes on said tank, third power means for applying power to said second spaced propeller, a first pair of elongated struts extending between the open ends of said U-shaped chassis and the open ends of said U-shaped tank, a second pair of elongated struts extending between the closed end of said U-shaped chassis and the closed end of said U-shaped tank, a universal joint at each end of said struts providing a swivel connection between the struts, said chassis and said tank, and means for regulating the amount of power applied to said pairs of spaced propellers and said endless tracks to maintain the struts in a vertical position.

2. Underwater apparatus for performing manipulations at various submerged locations comprising a chassis, means carried by the chassis for advancing said chassis in a generally horizontal direction, a buoying tank, propeller means carried by the tank for advancing said tank in a generally horizontal direction, a plurality of elongated struts, a universal joint at each end of each strut connecting the lower ends of said struts to said chassis and the upper ends of said tank, means for sensing when said struts have deviated a predetermined amount from a vertical relationship, and means responsive to such deviation for operating said respective advancing means in a manner to restore said vertical relationship.

3. Underwater apparatus in accordance with claim 2 in which said sening means is carried by one of said struts.

4. Underwater apparatus in accordance with claim 3 in which said sensing means includes a pendulum supported electrical contact and additional contacts fixedly disposed to either side thereof, whereby a sufficient deviation of said one strut from a vertical relationship will cause said pendulum supported contact to engage one or the other of said fixed contacts.

5. Underwater apparatus for performing manipulations at various submerged locations comprising a chassis, respective propeller means mounted at each side of said chassis for rotation about generally horizontal axes, respective first motor means for rotating said propeller means, a buoying tank, respective propeller means mounted at each side of said tank for rotation about generally horizontal axes, respective second motor means for rotating said last-mentioned means, a plurality of struts connected at their lower ends to said chassis by means of universal joints and connected at their upper ends to said tank by means of universal joints, means for supplying power to said first and second motor means, and means for proportioning said power between the first motor means and said second motor means at one side of said chassis and also between said first motor means and said second motor means at the other side in accordance with a predetermined amount of deviation of said struts from a vertical relationship to restore said vertical relationship.

6. Underwater apparatus in accordance with claim 5 including separate manually adjustable means for each side of the chassis associated with said power supplying means for determining the speed of the apparatus and for steering same.

7. Underwater apparatus in accordance with claim 6 including a pivotally connected manipulator mechanism carried on said chassis, whereby operation of said adjustable means may be accomplished.

8. Underwater apparatus in accordance with claim 7 including endless track means on said chassis at each side thereof for also advancing said chassis, and respective third motor means for driving said endless track means, said proportioning means also proportioning the power delivered to said third motor means at each side of the chassis.

9. Underwater apparatus in accordance with claim 7 including respective further propeller means mounted on said tank at each side thereof for rotation about a vertical axis, respective fourth motor means for rotating said further propeller means in either direction, and separate manually adjustable means associated with each of said fourth motor means for supplying power to each said fourth motor means so as to operate each said fourth motor means in either direction, said last-mentioned adjustable means also each being operable by said manipulator mechanism.

10. An underwater apparatus for performing manipulations at various locations on the floor of a body of water comprising a chassis, track means in a common first plane carried by the chassis for advancing said chassis, a first propeller means mounted on said chassis for aiding said track means, a U-shaped buoying tank having the legs of the tank in a second common plane parallel to said first plane, a second propeller means carried by said tank for advancing said tank in a generally horizontal direction, a plurality of elongated struts, a universal joint at each end of each strut connecting the lower ends of said struts to said chassis and the upper ends to the legs of said tank, and means for coordinating the power output of said first and second propeller means and said track means to maintain the struts in a vertical position.

References Cited in the file of this patent

UNITED STATES PATENTS

| | | |
|---|---|---|
| 896,361 | Cage | Aug. 18, 1908 |
| 1,356,294 | Kuhajda | Oct. 19, 1920 |
| 1,364,143 | Reno | Jan. 4, 1921 |
| 1,375,278 | Clayton | Apr. 19, 1921 |
| 1,409,690 | Eveleth | Mar. 14, 1922 |
| 1,450,232 | Setlow | Apr. 3, 1923 |
| 1,854,906 | Kulik | Apr. 19, 1932 |
| 1,997,149 | Lake | Apr. 9, 1935 |
| 2,061,256 | Romano | Nov. 17, 1936 |
| 2,863,293 | Plumer | Dec. 9, 1958 |
| 2,981,073 | Robinson | Apr. 25, 1961 |
| 2,987,893 | Robinson | June 13, 1961 |

FOREIGN PATENTS

| | | |
|---|---|---|
| 6,164 | Great Britain | 1909 |